(12) United States Patent
Klein Swormink et al.

(10) Patent No.: US 10,785,848 B2
(45) Date of Patent: Sep. 22, 2020

(54) LIGHTING SYSTEM COMMISSIONING

(71) Applicant: SIGNIFY HOLDING B.V., Eindhoven (NL)

(72) Inventors: Michel Albertus Theodorus Klein Swormink, Eindhoven (NL); Vincent Antoine Josephus Luijcks, Eindhoven (NL); Marcel Beij, Eindhoven (NL); Marco Haverlag, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/336,573

(22) PCT Filed: Sep. 29, 2017

(86) PCT No.: PCT/EP2017/074734
§ 371 (c)(1),
(2) Date: Mar. 26, 2019

(87) PCT Pub. No.: WO2018/060398
PCT Pub. Date: Apr. 5, 2018

(65) Prior Publication Data
US 2019/0223271 A1    Jul. 18, 2019

(30) Foreign Application Priority Data

Sep. 29, 2016 (EP) .................................. 16191260

(51) Int. Cl.
*H05B 47/105* (2020.01)
*H05B 47/19* (2020.01)

(52) U.S. Cl.
CPC .......... *H05B 47/105* (2020.01); *H05B 47/19* (2020.01)

(58) Field of Classification Search
None
See application file for complete search history.

(56) References Cited

U.S. PATENT DOCUMENTS

| 8,508,148 B1 * | 8/2013 | Carley ................... G08C 17/02 |
| | | 315/291 |
| 9,192,019 B2 * | 11/2015 | Huizenga ............... H05B 37/02 |
| 2008/0265799 A1 * | 10/2008 | Sibert ................... H05B 47/12 |
| | | 315/292 |

(Continued)

FOREIGN PATENT DOCUMENTS

| CN | 102155648 A | 8/2011 |
| WO | 2007086018 A1 | 8/2007 |
| WO | 2012107801 A1 | 8/2012 |

*Primary Examiner* — Crystal L Hammond
(74) *Attorney, Agent, or Firm* — Akarsh P. Belagodu

(57) ABSTRACT

The invention provides a lighting system and a lighting control component for such a system. The components are battery-operated, and include a remote control signal receiver for receiving commands and configurations during commissioning. A disabling system is provided for enabling and disabling the remote control signal receiver, such that the remote control signal receiver is enabled when a commissioning process of the lighting system is expected and disabled when a commissioning process of the lighting system is not expected. This reduces the power consumption of the component after the commissioning is complete but provides ease of use during commissioning.

7 Claims, 3 Drawing Sheets

(56) References Cited

U.S. PATENT DOCUMENTS

| | | | |
|---|---|---|---|
| 2009/0261735 A1* | 10/2009 | Sibalich | H05B 37/0218 |
| | | | 315/149 |
| 2011/0074225 A1 | 3/2011 | Delnoij et al. | |
| 2011/0199004 A1 | 8/2011 | Henig et al. | |
| 2011/0213472 A1 | 9/2011 | Clayton et al. | |
| 2013/0109406 A1 | 5/2013 | Meador et al. | |
| 2013/0134891 A1* | 5/2013 | Woytowitz | H05B 47/175 |
| | | | 315/201 |
| 2015/0008831 A1 | 1/2015 | Carrigan et al. | |
| 2015/0061511 A1 | 3/2015 | Chemel et al. | |
| 2016/0095188 A1* | 3/2016 | Verberkt | H05B 37/0227 |
| | | | 315/151 |
| 2016/0353559 A1* | 12/2016 | Mann | H04L 12/2816 |
| 2017/0238401 A1* | 8/2017 | Sadwick | F21K 9/235 |
| | | | 315/294 |

\* cited by examiner

50 — enabling a remote control receiver function of battery-operated lighting control components 52 — commissioning of the lighting system by communicating with the battery-operated lighting control components of the system using the remote control receiver function 54 — disabling the remote control receiver function of the battery-operated lighting control components

Fig. 3

LIGHTING SYSTEM COMMISSIONING

CROSS-REFERENCE TO PRIOR APPLICATIONS

This application is the U.S. National Phase application under 35 U.S.C. § 371 of International Application No. PCT/EP2017/074734, filed on Sep. 29, 2017, which claims the benefit of European Patent Application No. 16191260.5, filed on Sep. 29, 2016. These applications are hereby incorporated by reference herein.

FIELD OF THE INVENTION

The present invention relates to lighting system commissioning.

BACKGROUND OF THE INVENTION

Networked lighting systems are used for commercial and other premises and may be managed from a central location to simplify maintenance and optimize energy consumption. The lighting system implements at least partially automated control by means of sensors such as daylight sensors and occupancy sensors.

The field of commissioning of lighting control systems to manage such intelligent lighting systems is becoming an increasingly critical step for a successful installation. Proper commissioning is essential for proper equipment operation, user acceptance and reaching target energy savings.

Once initially installed, a lighting system needs to be commissioned so as to associate switches and sensors with one or more luminaires. Typically, the commissioning is carried out by a manual process of association so that the luminaires can be operated individually or in groups by specific switches and sensors, with the overall network being managed by a central controller. As a result, the commissioning of a lighting network is currently a labour intensive and error prone process.

While in principle there are enormous advantages to be gained by the lighting systems incorporating intelligent luminaires, the cost and required resources for installation and proper commissioning of such complex lighting systems may form a bottleneck for involved decision makers, and may inhibit the take-up of the opportunities to be offered by intelligent lighting systems. With a properly commissioned system however, embedded and automatic lighting control systems can reduce lighting consumption by 20% to 40% in existing buildings and new constructions, as compared with conventional lighting systems.

There are also lighting systems which make use of wireless control switches and sensors. These have the advantage that they can easily be installed and relocated without needing to change the wiring infrastructure of a building. The sensors and switches communicate wirelessly with the lighting system controller. The sensors for example comprises light sensors, for automatically controlling the lighting based on ambient light levels, and occupancy sensors for automatically controlling the lighting based on presence detection.

The switches and sensors are generally battery-operated, so it is particularly important to reduce energy consumption to a minimum. Energy harvesting approaches have been proposed, for example the physical interaction with a switch may be used to harvest sufficient energy for performing the required wireless communication of the switch command to the central control system. For sensors which need to be in a monitoring mode continuously, this is less of an option.

One feature which would assist in the commissioning process would be the ability to communicate with the sensors or switches using a remote control signal. However, this requires the sensor or switch to be in a standby mode ready to receive such remote control signals, and this represents an undesired energy drain.

This communication using a remote control signal would be part of a manual commissioning process. Even if a system has an auto-commissioning functionality, a manual override is desired to be able to correct for errors during an auto-commissioning procedure.

SUMMARY OF THE INVENTION

The invention is defined by the claims.

According to examples in accordance with an aspect of the invention, there is provided a lighting control component for forming part of a lighting system, comprising:

a battery for providing power to the lighting control component;

a remote control signal receiver for receiving a commissioning signal; and a disabling system for enabling and disabling the remote control signal receiver, adapted such that the remote control signal receiver is enabled when a commissioning process of the lighting system is expected and disabled when a commissioning process of the lighting system is not expected. The latter is achieved in at least one of the following ways: (i) the disabling system is adapted to enable the remote control signal receiver for a fixed duration after initial provision of power to the lighting control component, and then to disable the remote control signal receiver, or (ii) the lighting control component further comprises an occupancy sensor unit having an occupancy sensor element, and the disabling system is adapted to enable the remote control signal receiver when the occupancy sensor element detects occupancy.

The commissioning process may be "expected" because the component is first being used, or it may be "expected" because a user is in the vicinity. Alternatively, it may also be "expected" in the sense that it is known to be taking place because the component has been set to a commission mode, or in the sense that at all other times it is not expected.

The lighting control components are intended to form a lighting system by forming a network with lighting elements. The control component is then part of an automated control system for the lighting system. The control component for example may comprise a light sensor or a presence detection sensor or a switch.

The disabled mode of the remote control signal receiver is a mode in which it consumes no power (or only consumes power through energy leakage and not through active operation of any components).

The remote control signal receiver is for example for an infrared remote control signal, such as according to the RC5 protocol. It means the commissioning process is made easier, as physical manual interaction with the control component is not needed during commissioning of the light system. Instead, remote control signals may be used to create the desired relationships between the different components of the system as well as providing the desired settings of the components. However, after installation, the remote control capability no longer consumes power at the component. The disabling may for example be a hardware disable function.

When the disabling system is adapted to enable the remote control signal receiver for a fixed duration after initial provision of power to the component, and then to disable the remote control signal receiver, the commissioning is expected to take place within a fixed time after installing and powering the component, for example within a number of minutes, hours or days.

The component may then further comprise a manual enable switch for manually enabling the remote control signal receiver. In this way, the system may be reconfigured even if the power supply is not removed from the component, by providing a manual reset capability.

When the lighting control component further comprises an occupancy sensor unit having an occupancy sensor element, and the disabling system is adapted to enable the remote control signal receiver when the occupancy sensor element detects occupancy, commissioning can only take place when an occupant is present—namely the installer of the system or subsequent servicing personnel. The occupancy sensor unit may be a PIR sensor.

Next to an occupancy sensor unit, the lighting control component may also comprise a light sensor unit or a switch unit.

The component for example further comprises a wireless communications system for communicating wirelessly with a lighting system controller. It thus forms part of a wireless network of devices under the control of the lighting system controller.

The invention also provides a lighting system comprising:
a set of luminaires;
a set of lighting control components, each as defined above; and
a lighting system controller for controlling the luminaires based on a commissioned configuration of the lighting system.

Examples in accordance with another aspect of the invention provide a method of commissioning a lighting system which comprises a set of luminaires and a set of battery-operated lighting control components, the method comprising:
enabling a remote control receiver function of the battery-operated lighting control components;
subsequently performing commissioning of the lighting system by communicating with the battery-operated lighting control components using the remote control receiver function; and subsequently disabling the remote control receiver function of the battery-operated lighting control components.

In this method, the remote control receiver function is enabled for a predetermined time from initial powering of the battery-operated lighting control components, and/or the battery-operated lighting control components comprise occupancy sensor elements, wherein the enabling is performed when the occupancy sensor elements detect occupancy.

In this method, the remote control receiver function is disabled after the commissioning process. The remote control receiver function may be enabled for a predetermined time from initial powering of the battery-operated lighting control components, during which predetermined time the commissioning takes place.

When the battery-operated lighting control components comprise occupancy sensor elements, the enabling for a component may be performed when the occupancy sensor element detects occupancy.

BRIEF DESCRIPTION OF THE DRAWINGS

Examples of the invention will now be described in detail with reference to the accompanying drawings, in which:

FIG. 3 shows a commissioning method for a lighting system.

DETAILED DESCRIPTION OF THE EMBODIMENTS

The invention provides a lighting system and a lighting system control component for such a system. The components are battery-operated, and include a remote control signal receiver for receiving commands and configurations during commissioning. A disabling system is provided for enabling and disabling the remote control signal receiver, such that the remote control signal receiver is enabled when a commissioning process of the lighting system is expected and disabled when a commissioning process of the lighting system is not expected. This reduces the power consumption of the component after the commissioning is complete but provides ease of use during commissioning.

Figure 1:
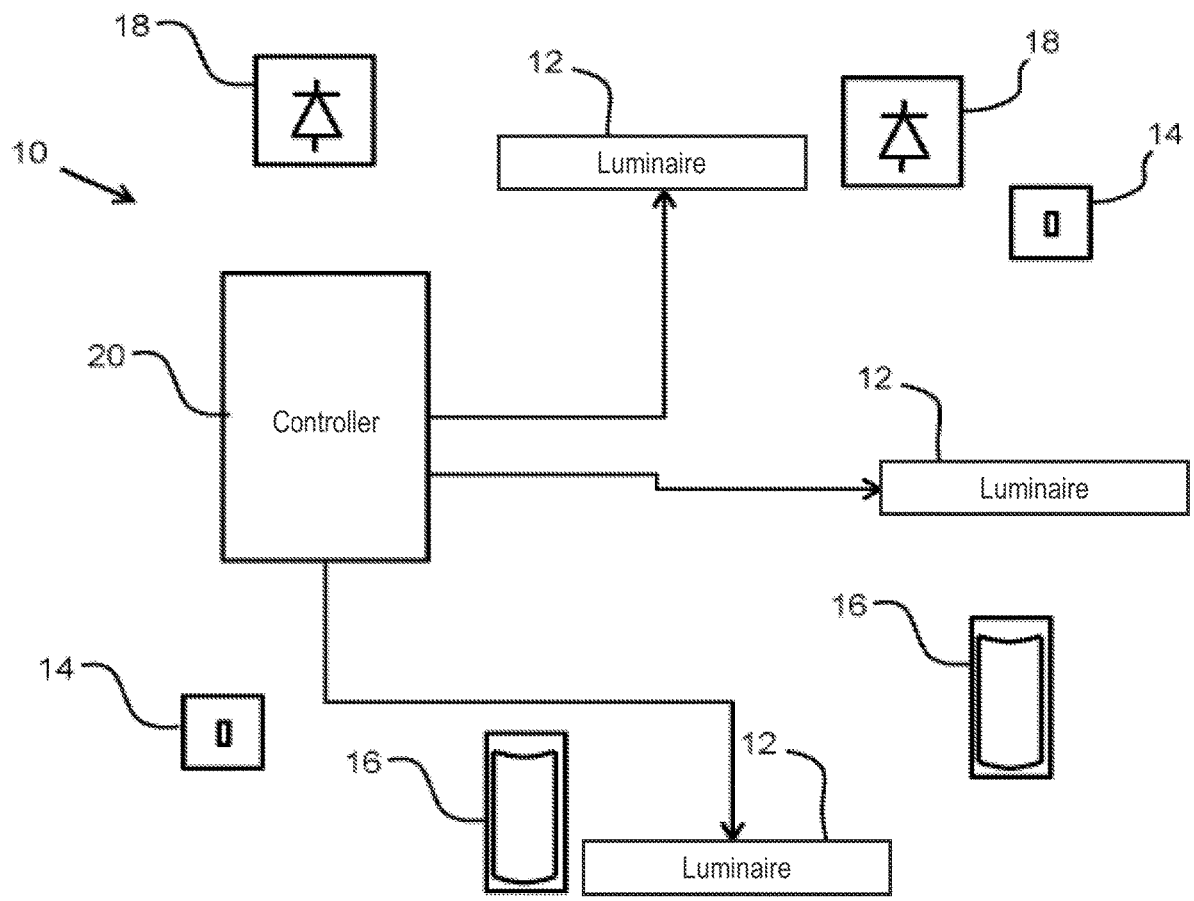
FIG. 1 shows a lighting system.

FIG. 1 shows a lighting system 10 comprising a set of luminaires 12 and a set of lighting control components. The lighting control components comprise switches 14, passive infrared (PIR) occupancy sensors 16 and light sensors 18. These three functions are shown implemented by separate components, but occupancy sensing and light sensing may for example be performed in a single device.

There may be other networked components such as gateways and a building management system.

A lighting system controller controls the luminaires 12 based on a commissioned configuration of the lighting system. For example, a group of luminaires may be associated with each particular PIR sensor 16 so that they come on when occupancy is detected. Different luminaires may also be associated with different light sensors 18 for automatic lighting control, and the switches may be configured to control different sets of luminaires.

The known commissioning process is thus typically a manual operation by which a sensor is linked to the luminaire group.

The system may control dimming settings as well as on-off control. The commissioning may also set other parameters such as time delay values, and trigger levels for the different sensors.

The controller 20 is wired to the luminaires (since they need to be wired to the infrastructure of the building in any case), but the other components are wireless components.

They communicate with the controller 20 over a wireless communication channel. The luminaires may instead also communicate wirelessly with the central controller 20. Within the system, there may be some wired components and some which connect to the controller wirelessly. This invention relates in particular to wireless control components.

The use of wireless control components enables free placement of sensors and switches without the need to adapt the wiring infrastructure. Thus, it facilitates initial installation and also system reconfiguration, for example if the layout of a space has been changed.

A quicker and hence less costly commissioning may be achieved by providing the components with a wireless control interface to the installer, such as an infrared RC5 interface.

However, while on standby and therefore able to receive remote control signals, the circuitry consumes power, which therefore shortens the time between maintenance operations of the wireless components.

Figure 2:
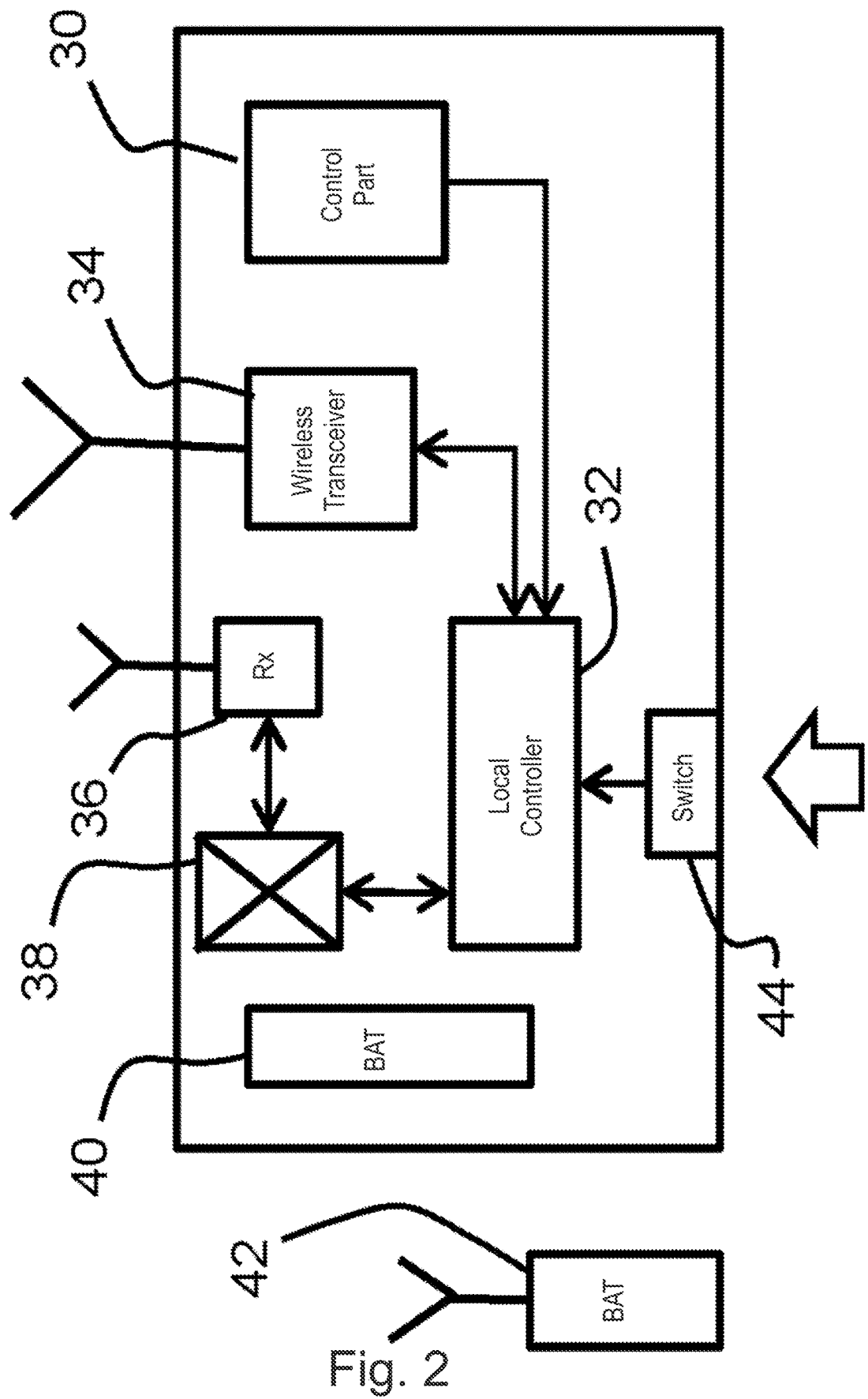
FIG. 2 shows in general form the components which make up the overall control components used within the lighting system.

The invention provides a battery-operated lighting control component for use in the lighting system, one example of which is shown in FIG. 2.

The component comprises a control part 30 which depends on the function being implemented. For example, the control part 30 may comprise a light sensor, or an occupancy sensor or a manually operated control switch. Thus, the general architecture shown in FIG. 2 is suitable for any of the different types of component.

The control part 30 communicates with a local controller 32 which operates a wireless transceiver 34 for communicating with the central system controller 20. The local controller 32 also receives signals from a remote control (infrared) signal receiver 36, but there is also a disabling system 38 for enabling and disabling the remote control signal receiver 36.

In the disabled state, the receiver 36 is powered down so does not consume any power, but also is unable to be awakened by an incident remote control signal.

FIG. 2 shows the battery 40 which is the power supply for the component.

The component is also associated with a remote control device 42 which may be shared between multiple components, by having a short range communication distance.

The remote control signal receiver 36 is enabled when a commissioning process of the lighting system is expected and disabled when a commissioning process of the lighting system is not expected.

The commissioning process is for example expected when power is first applied to the component, i.e. when the component is being installed.

The commission process, using such a remote control, may then comprise using the remote control to unlock the network and open the network.

The sensor is then controlled to join the network,

The remote control is then used to close the network and lock the network.

Unlocking/locking the network and opening/closing the network may be performed by a push button on the remote control.

A button on the sensor to be added may be used to perform the joining function (so-called "button-linking").

Alternatively, the remote control signal sent to the sensor may trigger it to execute the commissioning step (i.e. joining the network) using the communication channel between the controller 20 and the transceiver 34. This for example involves the sensor transmitting a MAC address to the controller 20. The wireless protocol for the main control communication channel for example comprises ZigBee, although other wireless communications protocols may be used, such as BlueTooth.

In this way, the commissioning does not require any manual interaction with the sensor.

As mentioned above, the commissioning process is for example expected when power is first applied to the component. Thus, in a first example the disabling system 38 allows remote control signals to be processed during an initial time period such as a number of days. This may correspond to the maximum expected installation time, for example 7 days.

The commissioning process is made easier, as physical manual interaction with the component is not needed. Instead, remote control signals may be used to create the desired relationships between the different components of the system as well as providing the desired settings of the components.

However, after installation and at the end of the predetermined time period, the remote control capability is disabled so no longer consumes power at the component.

The disabling may for example be a hardware disable function, for example a transistor which is in series with the power line to the receiver, and which thereby cuts off the power supply to the receiver 36.

It may be desired to reconfigure the system some time after the initial commissioning. This may be achieved by removing the battery 42 so that a reset is forced on the system. Alternatively, the component may further comprise a manual enable switch 44 for manually enabling the remote control signal receiver once more for the predetermined time period, without having to remove the battery.

In a second example, specifically for an occupancy sensor component 16, the disabling system enables the remote control signal receiver when the occupancy sensor element of the component detects occupancy. A commissioning person will be present during the commissioning process, so that the remote control function can be disabled when there is no detected presence.

FIG. 3 shows a method of commissioning the lighting system.

In step 50, a remote control receiver function of battery-operated lighting control components is enabled. This enabling may be an initial default factory setting of the components.

In step 52 there is commissioning of the lighting system by communicating with the battery-operated lighting control components of the system using the remote control receiver function.

After the commissioning, the remote control receiver function of the battery-operated lighting control components is disabled in step 54. As explained above, this may be based on a time-out or it may be because the person commissioning the system is no longer present and hence detected by a PIR sensor.

Two examples have been given above of how it may be determined that the commissioning process is expected. Another option is to enable the remote control signal processing until a manual interrupt switch is operated. For example, after initial commissioning, a push button may simply be pressed manually, in order to disable the remote control functionality. The remote control function may first need to be enabled by a manual selection, or it may be set as initially enabled.

Thus there are various ways to implement the desired functionality, which in general provides a time period of enabled remote control functionality, and a time period of disabled remote control functionality, with the enable period intended for a commissioning process.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A battery-operated lighting control component comprising:
   a battery for providing power to the lighting control component;
   a remote control signal receiver for receiving a commissioning signal, wherein the commissioning signal links the lighting control component to a luminaire; and
   a disabling system for enabling and disabling the remote control signal receiver wherein the disabling system is adapted to enable the remote control signal receiver for a fixed duration after initial provision of power to the lighting control component, and then to disable the remote control signal receiver, and/or
   wherein the lighting control component further comprises an occupancy sensor unit having an occupancy sensor element, and wherein the disabling system is adapted to enable the remote control signal receiver when the occupancy sensor element detects occupancy;
   wherein the lighting control component is configured to remain active when the disabling system disables the remote control receiver.

2. The lighting control component as claimed in claim 1, further comprising a manual enable switch for manually enabling the remote control signal receiver.

3. The lighting control component as claimed claim 1, wherein the occupancy sensor is a PIR occupancy sensor.

4. The lighting control component as claimed in claim 1, wherein the remote control signal receiver comprises an infrared receiver, for example using the RC5 protocol.

5. The lighting control component as claimed in claim 1, further comprising a wireless communications system for communicating wirelessly with a lighting system controller.

6. A lighting system comprising:
   a set of luminaires;
   a set of lighting control components, each as claimed in claim 1; and
   a lighting system controller for controlling the luminaires based on a commissioned configuration of the lighting system.

7. A method of commissioning a lighting system which comprises a set of luminaires and a set of battery-operated lighting control components, the method comprising:
   enabling a remote control receiver function of the battery-operated lighting control components;
   subsequently performing commissioning of the lighting system by communicating with the battery-operated lighting control components using the remote control receiver function, wherein the commissioning links the lighting control components to the luminaires; and
   subsequently disabling the remote control receiver function of the battery-operated lighting control components,
   wherein the remote control receiver function is enabled for a predetermined time from initial powering of the battery-operated lighting control components, and/or
   wherein the battery-operated lighting control components comprise occupancy sensor elements, wherein the enabling is performed when the occupancy sensor elements detect occupancy;
   wherein the lighting control component is configured to remain active when the disabling system disables the remote control receiver.

* * * * *